United States Patent [19]

Sassano

[11] 4,439,914

[45] Apr. 3, 1984

[54] ADHESIVE OIL RESISTANT INSULATED WIRE CONSISTING OF TWO LAYERS INCLUDING AN UNCATALYZED EPOXY-PHENOXY RESIN OUTER LAYER

[75] Inventor: Daniel R. Sassano, Monroeville, Pa.

[73] Assignee: Westinghouse Electric Corp., Pittsburgh, Pa.

[21] Appl. No.: 361,212

[22] Filed: Mar. 24, 1982

[51] Int. Cl.³ .................. B05D 5/12; B32B 15/08
[52] U.S. Cl. ................. 29/605; 427/120;
427/386; 427/388.1; 427/410; 427/434.6;
428/383
[58] Field of Search ............ 427/118, 120, 386, 388.1,
427/410, 434.6; 428/383; 29/596, 605

[56] References Cited

U.S. PATENT DOCUMENTS

| | | | |
|---|---|---|---|
| 3,412,354 | 11/1968 | Settler | 336/205 |
| 3,822,147 | 7/1974 | Koerner et al. | 428/383 |
| 3,842,192 | 10/1974 | Hilker et al. | 336/205 |
| 4,129,678 | 12/1978 | Seki et al. | 428/383 |

FOREIGN PATENT DOCUMENTS 53-13795 5/1978 Japan .

OTHER PUBLICATIONS

Lee et al., Handbook of Epoxy Resins, McGraw Hill, N.Y., 1967, pp. 2-9 to 2-10.

*Primary Examiner*—Michael R. Lusignan
*Assistant Examiner*—Richard Bueker
*Attorney, Agent, or Firm*—D. P. Cillo

[57] ABSTRACT

A bondable electrical conductor is made of an adherent insulating resinous first layer, directly covered by an adhesive layer consisting essentially of the uncatalyzed mixture of epoxy resin, having an epoxy equivalent weight of from about 250 to about 750, and a phenoxy resin.

8 Claims, No Drawings

ADHESIVE OIL RESISTANT INSULATED WIRE CONSISTING OF TWO LAYERS INCLUDING AN UNCATALYZED EPOXY-PHENOXY RESIN OUTER LAYER

BACKGROUND OF THE INVENTION

Magnet wires having polyvinyl formal, acrylic, or polyimide insulation, have long been topcoated with either epoxy, polycarbonate, polyvinyl butyral, phenoxy, or polypropylene, to provide improved oil and abrasion resistance, as taught by Koerner et al., in U.S. Pat. No. 3,822,147, and Hilker et al., in U.S. Pat. No. 3,842,192. An additional quality, sometimes required, is a self-bondable outer adhesive varnish layer. These outer layers are fusible, acting as an adhesive, and after a coil is wound, the windings may be heated to bond the conductors into a unitary mass.

Sattler, in U.S. Pat. No. 3,412,354, taught catalyzed, amine-modified epoxy resins as an outer adhesive coat. Seki et al., in U.S. Pat. No. 4,129,678, taught a three layer, oil resistant, adhesive outercoat system, consisting of a polyimide, polyamide imide, or polyesterimide insulation base, a polyvinyl formal or epoxy resin intermediate layer, and an outer adhesive layer consisting of a mixture of high molecular weight phenoxy resin, with either an epoxy resin, a polyester, or a stabilized isocyanate, generally catalyzed with amine or $BF_3$-amine complex. The intermediate layer is taught as necessary to provide adequate adhesive properties. These catalyzed adhesive layers are usually applied in a process separate from the base and intermediate layers, usually at a lower temperature and higher speed, requiring the use of two heating tower operations, adding significantly to cost. Also, the use of catalysts in the adhesive layer, even at low solvent evaporation temperatures, may cause premature set-up, lowering subsequent adhesiveness. What is needed is a one-step process, utilizing overcoats that retain maximum adhesiveness after application and solvent evaporation, and show even more improved oil resistance.

SUMMARY OF THE INVENTION

The above needs have been met, and the above problems solved, by providing an adhesive-coated, high-temperature insulated, electrical conductor consisting of, in combination, two separate layers, including an oil resistant, uncatalyzed epoxy-phenoxy resin outer adhesive layer, that can be applied at the same temperature and speed as the base insulation resin. The top adhesive layer is coated directly over, to completely contact, the adherent insulating resinous first layer, without applying a separate intermediate resinous layer. In the adhesive layer, the epoxy resin is, preferably, a solid bisphenol A or solid novolac type, and must have a low epoxy equivalent weight range of from about 250 to about 750. The phenoxy resin preferably has a high molecular weight range of from about 20,000 to about 50,000. The resins are added in a weight ratio (epoxy):(phenoxy) of from about (1):(0.5 to 2.5).

The adhesive coating material can be applied over a wide range of speed rates and oven temperatures, to provide a dual-layer magnet wire having outstanding adhesive properties and excellent hot oil resistance. The adhesive coating is also tough and flexible, so that automatic winding machines may be employed to wind the adhesive-coated wire into coils. Wound coils may be heated to a point where fusion of the adhesive layer occurs, with good conductor wire-to-conductor wire adhesion. Unexpectedly, by eliminating catalysts, and using only base and adhesive layers, the adhesive layer could be coated at base layer speds and use the same oven temperatures, and resulted in an adhesive layer possessing thermoplastic-thermoset properties, to the great benefit of bonding.

DESCRIPTION OF THE PREFERRED EMBODIMENTS

Well-known wire enamel insulating coatings may be employed as the first layer or undercoating on a copper or aluminum, round or rectangular, electrical conductor. Examples of suitable first layer materials are polyvinyl formal, polyimide, polyamide imide, polyesterimide, polyesteramideimide, polyester, and the like, all well known in the art. These may be in solvent or solventless form.

Compositions suitable for adhesive coating of undercoated electrical conductors according to this invention, consist essentially of an uncatalyzed admixture of: (1) an epoxy resin, preferably selected from the group consisting of solid diglycidyl ethers of bisphenol A or glycidyl ethers of novolac resins and (2) a phenoxy resin. The epoxy resin must have a low epoxy equivalent weight range of from about 250 to about 750, preferably from about 350 to about 650. Epoxy resins in liquid form, or having epoxy equivalent weights outside the widest range, provided adhesive coatings having lowered oil resistance. The "epoxy equivalent weight" is determined by dividing the average molecular weight by the average number of epoxide groups in the average molecule, and is a well-known term in the art. Both bisphenol A and novolac epoxy resins are well known, and reference may be made to Lee and Neville, *Handbook Of Epoxy Resins*, McGraw Hill, 1967, pp. 2—2 to 2-12, for their detailed description.

Phenoxy resins are different from epoxy resins. The phenoxy resins have a molecular weight of over about 15,000, have only a possibility of some terminal epoxy groups, and possess entirely different physical and chemical properties. An example of a phenoxy structure is:

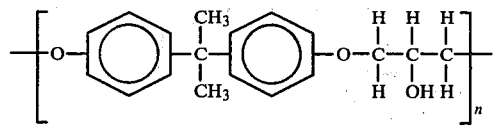

where n is from about 82 to 123. These resins are well known in the art, and are described in detail in, for example, U.S. Pat. No. 3,822,147. Phenoxy resins useful in the adhesive compositions of the invention are solids, and have a high molecular weight range of from about 20,000 to 50,000, preferably from about 25,000 to about 40,000. The useful weight ratio range of (epoxy resin):(phenoxy resin) is from about (1):(0.5 to 2.5), preferably from about (1):(1 to 2). Under about 0.5 part phenoxy per 1 part epoxy, the adhesive layer will not provide either good bonding or good oil resistance. Over about 2.5 parts phenoxy per 1 part epoxy, the adhesive composition will be very thick, have poor flow properties, and may result in non-uniform coverings.

Useful solvents for the epoxy and phenoxy resin mixture include cresylic acid, xylene, ketones, cellosolve acetate, aromatic petroleum products, and the like. Usually, the epoxy component is dissolved first and then the phenoxy added to the solution. Solvent is used in an amount effective to dissolve the epoxy and phenoxy, and provide a solids content of from about 15% to about 35%. No catalysts are ever used, and are in fact specifically excluded. By not using a catalyst, a thermoplastic-thermoset type adhesive coating is provided, which can have solvent driven off without causing any substantial reaction or curing, yet can be completely set in a curing oven to provide a strong thermoplastic-thermoset bond.

Usually, copper or aluminum wire is continuously passed through a resin application means, for example, a base resin solution dip, metering, and tower oven solvent evaporation process, from two to ten times; after which the base-coated wire is continuously passed through an adhesive resin solution dip, metering and tower oven solvent evaporation, at least once; after which the adhesive-coated, dual-layer copper or aluminum wire can be wound onto a take-up reel and subsequently wound into a coil. In some instances it may be advantageous to use a solventless resin as a base coat, so that the solvent evaporation step would not be necessary in the base coat application step. The wound coils can be heated to fuse the adhesive layers, to provide a unitary rigid coil. Conductor speed rates and oven temperatures can be the same for the base layer and the top adhesive layer. Feed rates can vary from about 20 to 70 ft./min. and oven temperatures can range from about 200° C. to about 450° C. An intermediate resin layer separately applied and different from the base and adhesive layer is not used in the method of this invention.

EXAMPLE 1

Three sample compositions were made. Sample 1 contained 81 grams of a solid diglycidyl ether of bisphenol A epoxy resin, having a Durran's melting point of from 65° C. to 75° C., and a low epoxy equivalent weight of from 450 to 550 (sold commercially by Shell Chemical Co. as Epon 1001); 126 grams of solid phenoxy resin having a molecular weight of from 25,000 to 35,000 (sold commercially by Union Carbide Corp. as Phenoxy PKHC); 487 grams of thinner grade cresylic acid; and 207 grams of an aromatic petroleum solvent (sold commercially by Humble Oil Co. as Solvesso 100). The epoxy was first dissolved in the solvent mixture at 25° C., followed by dissolving the phenoxy. The weight ratio of epoxy:phenoxy was 1:1.5. The specific gravity of Sample 1 was about 1.005, the viscosity at 25° C. was 2,950 cps., and the flash point was about 43° C. No catalyst of any type was used.

Comparative Sample 2 contained the same ingredient as Sample 1, except that 81 grams of a liquid diglycidyl ether of bisphenol A epoxy resin, having a viscosity at 25° C. of from 10,000 to 16,000 cps., and a very low epoxy equivalent weight of from 185 to 192 (sold commercially by Shell Chemical Co. as Epon 828) was substituted for the Epon 1001. Comparative Sample 3 contained the same ingredients as Sample 1, except that 81 grams of a solid diglycidyl ether of bisphenol A epoxy resin, having a Durran's melting point of from 95° C. to 105° C., and a high epoxy equivalent weight of from 875 to 1025 (sold commercially by Shell Chemical Co. as Epon 1004) was substituted for the Epon 1001.

The three samples were brushed on separate 4 sq.in. portions of 3 in.×6 in.×⅛ in. aluminum panels, to a thickness of about 1 mil. The sample coatings were then each covered by a 2 in.×2 in.×0.010 in. sheet of Kraft paper. A 1-pound weight was then placed on the respective Kraft paper-sample coated panels, which were then placed in an oven for 1 hour at 150° C., to firmly bond the Kraft paper to the panel with the adhesive coating. As a screening test for oil endurance, the panels were each placed in stainless steel containers filled with transformer oil heated to 150° C. The panels were left in the hot oil for 16 hours, taken out, cooled, and observed for Kraft paper peeling due to adhesive deterioration.

The Kraft paper on the panels using the comparative Sample 2 and Sample 3 adhesive coatings easily came off. The Kraft paper on the panel using the Sample 1 adhesive coating of this invention had to be torn off the panel, exhibiting a far greater oil resistance and adherence to the Kraft paper than the comparative Samples 2 and 3. As can be seen, liquid bisphenol A resins or high epoxy equivalent weight bisphenol A resins are not effective in providing good oil resistance for the adhesive coating.

EXAMPLE 2

Number 18 copper wire was continuously passed through a bath of polyvinyl formal base coating resin solution, and through a die to meter a 0.5 mil (0.0005 inch) build on the wire, after which it was passed through a 12-foot tower evaporation oven having a bottom temperature of about 225° C. and a top temperature of about 400° C. After seven passes through the bath, die, and oven, an approximate 3.0 mil thick, adherent, polyvinyl formal base coat layer was deposited about the conductor. Then, the base-coated wire was continuously passed through a bath of uncatalyzed, epoxy-phenoxy adhesive resin solution, through a die to meter a 1.0 mil build on the wire, and then through the same 12-foot tower oven, to provide a two-layer, adhesive-coated, insulated magnet wire, which was cooled and wound onto a take-up reel. The wire speed through the entire process was about 28 ft./min. The epoxy-phenoxy resin had the same formulation as Sample 1 of Example 1.

The adhesive-coated wire was then wound on ¼ inch steel mandrels for 55 turns, to provide a number of 2½ inch long helical coils. The coils were placed in screw type vise fixtures, so tha pressure was applied along the coil length, pushing the turns tightly together. The fixtures with the coils were then placed in an oven for 1 hour at 150° C., to fuse the adhesive-coated wire strands together into unitary structures. The coils were then removed from their fixtures. Several of these coils were then subjected to the ASTM-D2519-75 helical coil test at 25° C., where the average force to break the coil was 35 pounds. Several of the remaining coils were then placed in a stainless steel container filled with transformer oil heated to 150° C. After 52 days the coils were removed and tested as above. The average force to break the coil was 22 pounds, which is an acceptable value for bonding adhesion and indicates a very good oil resistance in this severe test.

Additionally, number 12 copper wire was passed through a polyvinyl formal base coating resin solution and an uncatalyzed epoxy-phenoxy adhesive resin solution, exactly as described above, to provide an approximate 3.0 mil base coat layer and a 1.0 mil build adhesive layer, which was wound on a take-up reel. Several composite panels were then made. A top layer of Kraft paper was glued to three aluminum panels 2 in.×6 in.×⅛ in. with epoxy resin. Fourteen strands of the adhesive-coated, polyvinyl formal insulated wire, were cut and laid side by side to provide a series of insulated wires 1 inch wide×4½ inches long. The wires were in contact with each other across the width of one panel on top of glued Kraft paper. The second panel was placed on top of the first layer of adhesive-coated wires. A second layer of 14 cut strands of adhesive-coated, polyvinyl formal insulated wire was laid across the second panel, as described above. This layer of wire was topped by a third glued Kraft paper-coated panel. The composite was heated in a press at 150° C. for 1 hour at 50 psi. The pressure required to pull the second panel out of the composite at 100° C. was measured as 91.4 psi. Another composite panel was placed in a stainless steel container filled with transformer oil heated to 150° C. After 52 days the panel was removed, and the pressure required to pull the second panel out of the composite at 100° C. was measured as 66 psi., which is an acceptable value for bonding adhesion and indicates a very good oil resistance in this very severe test.

As can be seen from the helical coil and panel tests, the Sample 1 adhesive composition of Example 1 has outstanding adhesiveness, both strength, and oil resistance; and can be applied in a continuous process at the same speed rate, and using the same evaporation temperature as the base resin.

I claim:

1. A method of making an insulated, bondable electrical conductor comprising the steps of:
   (1) continuously passing an electrical conductor, at least once, at a first rate of speed, through first resin application means, to provide a first insulating layer deposited about the conductor, and then
   (2) continuously passing the insulated conductor, at the first rate of speed, through an adhesive resinous solution, and then a heating means at a temperature sufficient to drive off solvent, to provide a fusible adhesive layer coated directly over and contacting the first layer, where the adhesive solution consists essentially of the uncatalyzed solution mixture of an epoxy resin having an epoxy equivalent weight range of from about 250 to about 750 and a solid phenoxy resin, where the weight ratio of (epoxy resin):(phenoxy resin) in the mixture is from (1):(0.5 to 2.5).

2. The method of claim 1, where the phenoxy is a solid having a molecular weight range of from about 20,000 to about 50,000.

3. The method of claim 1, where the first resin application means comprises a first resinous insulating solution and a heating means to drive off solvent.

4. The method of claim 3, where the heating means in steps (1) and (2) has the same temperature range.

5. The method of claim 1, where, after step (2), the adhesive coated conductor is wound into a coil having a plurality of turns with contacting adhesive layers, which is then heated to fuse the adhesive layers, to provide a unitary rigid coil having an oil resistant outer layer.

6. The method of claim 1, where the adhesive solution consists of the uncatalyzed solution mixture of epoxy resin and phenoxy resin.

7. The method of claim 1, where there is no separate intermediate resin layer between the first layer and the adhesive layer, the electrical conductor is selected from the group consisting of copper and aluminum, the first layer insulation is selected from the group consisting of polyvinyl formal, polyimide, polyamide imide, polyesterimide, polyesteramideimide, and polyester, and the rate of speed can be from about 20 ft./min. to about 70 ft./min.

8. The method of claim 1, where the uncatalyzed solution mixture is made by dissolving the epoxy resin in solvent and then adding the phenoxy resin to the solution without heating, and solvent is driven off in step (2) without causing any substantial reaction or curing.

* * * * *